(12) United States Patent
Chun et al.

(10) Patent No.: US 11,621,445 B2
(45) Date of Patent: Apr. 4, 2023

(54) CHARGING/DISCHARGING DEVICE, HAVING REDUCED TEMPERATURE DIFFERENCE, FOR SECONDARY BATTERY FORMATION PROCESS

(71) Applicant: LG CHEM, LTD., Seoul (KR)

(72) Inventors: In Tae Chun, Daejeon (KR); Jae Huoung Son, Daejeon (KR); Chang Min Han, Daejeon (KR); Ik Soo Chae, Daejeon (KR); Chang Bum Ahn, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 554 days.

(21) Appl. No.: 16/633,498

(22) PCT Filed: Jan. 4, 2019

(86) PCT No.: PCT/KR2019/000122
§ 371 (c)(1),
(2) Date: Jan. 23, 2020

(87) PCT Pub. No.: WO2019/172515
PCT Pub. Date: Sep. 12, 2019

(65) Prior Publication Data
US 2021/0135299 A1    May 6, 2021

(30) Foreign Application Priority Data

Mar. 8, 2018 (KR) .................. 10-2018-0027427

(51) Int. Cl.
*H01M 10/44* (2006.01)
*H02J 7/00* (2006.01)
*H01M 10/052* (2010.01)

(52) U.S. Cl.
CPC ....... *H01M 10/446* (2013.01); *H01M 10/052* (2013.01); *H02J 7/0042* (2013.01); *H02J 7/0069* (2020.01)

(58) Field of Classification Search
CPC .... H01M 10/446; H02J 7/0069; H02J 7/0027; H02J 7/025; H02J 7/0042
See application file for complete search history.

(56) References Cited

U.S. PATENT DOCUMENTS

2008/0213652 A1\* 9/2008 Scheucher .......... H01M 10/613
                                                                429/97
2014/0072846 A1    3/2014 Oh et al.

FOREIGN PATENT DOCUMENTS

| CN | 103682522 A | 3/2014 |
|---|---|---|
| JP | 2004-179009 A | 6/2004 |

(Continued)

OTHER PUBLICATIONS

International Search Report issued in PCT/KR2019/000122 (PCT/ISA/210), dated Apr. 10, 2019.

(Continued)

*Primary Examiner* — Nathanael T Zemui
(74) *Attorney, Agent, or Firm* — Birch, Stewart, Kolasch & Birch, LLP (57) ABSTRACT

A charge/discharge device for an activation process of a secondary battery including an accommodation structure having a plurality of accommodation spaces and provided with a wiring duct at one side of each of the accommodation spaces, each of a plurality of charge/discharge boxes installed in each of the plurality of accommodation spaces, wires wired in a space inside the wiring duct, and an exhaust fan installed on an inner wall of the wiring duct, in which the exhaust fan is installed on the inner wall of the wiring duct adjacent to one side of the accommodation space, and the wires are wired to pass an external side of the exhaust fan is (Continued)

provided. A heat insulation panel may be additionally installed together with the exhaust fan in the wiring duct.

10 Claims, 8 Drawing Sheets

(56) References Cited

FOREIGN PATENT DOCUMENTS

| | | | |
|---|---|---|---|
| JP | 2012-252926 A | 12/2012 | |
| JP | 5127426 B2 | 1/2013 | |
| JP | 2013-168214 A | 8/2013 | |
| JP | 2016-134245 A | 7/2016 | |
| KR | 10-1998-075556 A | 11/1998 | |
| KR | 10-2011-0003912 A | 1/2011 | |
| KR | 10-2013-0093020 A | 8/2013 | |
| KR | 10-1319862 B1 | 10/2013 | |
| KR | 10-2015-0025685 A | 3/2015 | |
| KR | 10-2015-0034945 A | 4/2015 | |
| KR | 10-2016-0084221 A | 7/2016 | |
| KR | 10-2016-0084222 A | 7/2016 | |
| KR | 10-2016-0126490 A | 11/2016 | |
| KR | 10-2017-0100341 A | 9/2017 | |
| KR | 10-1816843 B1 | 1/2018 | |

OTHER PUBLICATIONS

Korean Office Action for Korean Application No. 10-2018-0027427, dated May 31, 2021, with English translation.

* cited by examiner

CHARGING/DISCHARGING DEVICE, HAVING REDUCED TEMPERATURE DIFFERENCE, FOR SECONDARY BATTERY FORMATION PROCESS

TECHNICAL FIELD

This application claims the benefit of priority based on Korean Patent Application No. 10-2018-0027427, filed on Mar. 8, 2018, and the entire contents of the Korean patent application are incorporated herein by reference.

The present invention relates to a charge/discharge device for an activation process of a secondary battery, and more particularly, to a charge/discharge device for an activation process of a secondary battery capable of controlling the internal temperature of a charge/discharge box to be uniform by not allowing the external heat generation and temperature difference, at the time of performing the activation process after manufacturing a secondary battery, to influence the inside of the charge/discharge box.

BACKGROUND ART

As technology development and demand for mobile devices are increasing and the spread of electric vehicles is expanding, demand for secondary batteries as energy sources is rapidly increasing. Among them, demand for lithium secondary batteries having high capacity and energy density is especially high.

In general, a lithium secondary battery is manufactured by containing in an electrode assembly consisting of a negative electrode, a positive electrode, and a separator into a pouch-shaped case of a cylindrical or rectangular metal can or an aluminum laminate sheet, and injecting electrolyte into the electrode assembly. The lithium secondary battery manufactured as described above can function as a battery only by activating the battery by performing a predetermined charge/discharge. Such a process is called a formation process or an activation process. In this activation process, a charge/discharge device is used. In the mass production process of secondary batteries, the charge/discharge device is generally set to be capable of simultaneously charging and discharging a plurality of cells in order to increase productivity.

Figure 1:
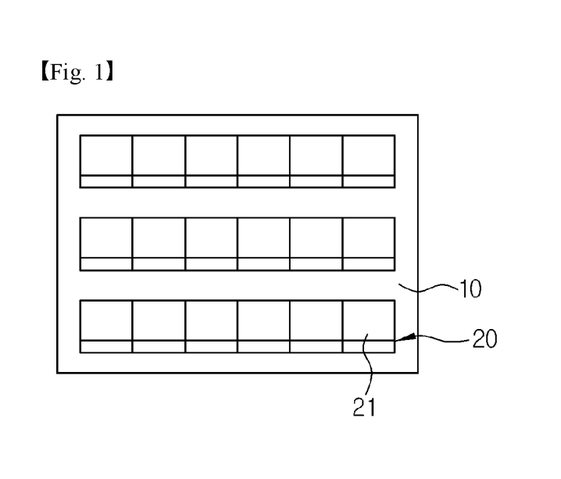
FIG. 1 is a plan view schematically showing an example of an arrangement state of a conventional charge/discharge device for performing a large amount of activation processes of a secondary battery.
Figure 2:
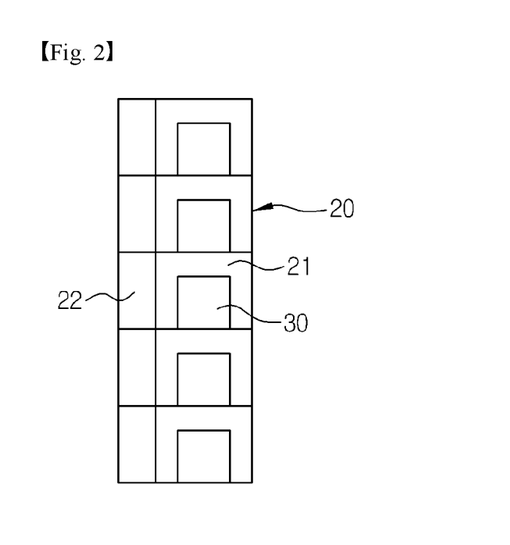
FIG. 2 is a side view of a part thereof.

FIG. 1 is a plan view schematically showing an example of an arrangement state of a conventional charge/discharge device for performing a large amount of activation processes of a secondary battery, and FIG. 2 is a side view of a part thereof. Referring to these drawings, an accommodation structure 20, in which the plurality of accommodation spaces 21 and the wiring duct 22 are provided so that a plurality of charge/discharge boxes can be piled up in the horizontal direction and the vertical direction, is arranged in an activation process chamber 10. And each of the accommodation spaces 21 is provided with a charge/discharge box 30.

Figure 3:
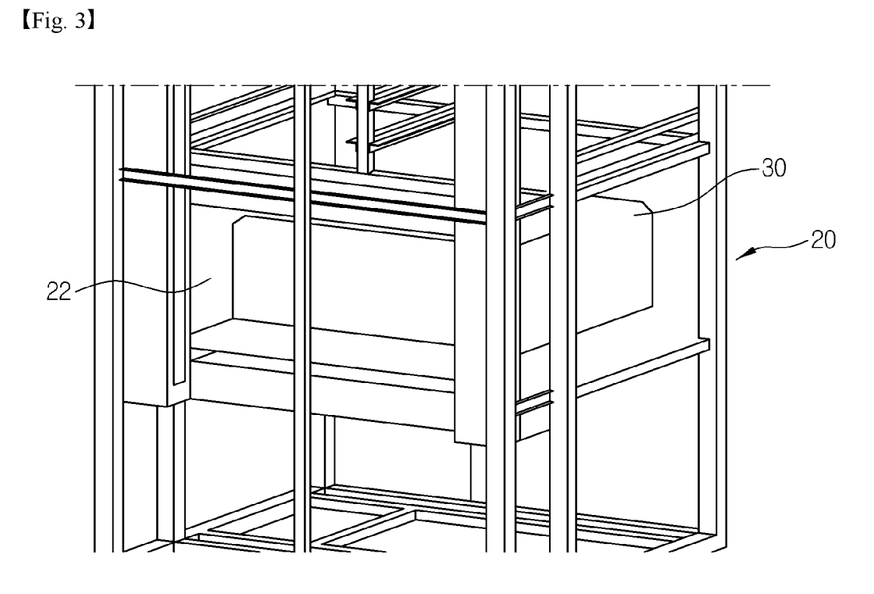
FIG. 3 is an enlarged perspective view of an accommodation space portion of one charge/discharge box in FIG. 2.
Figure 4:
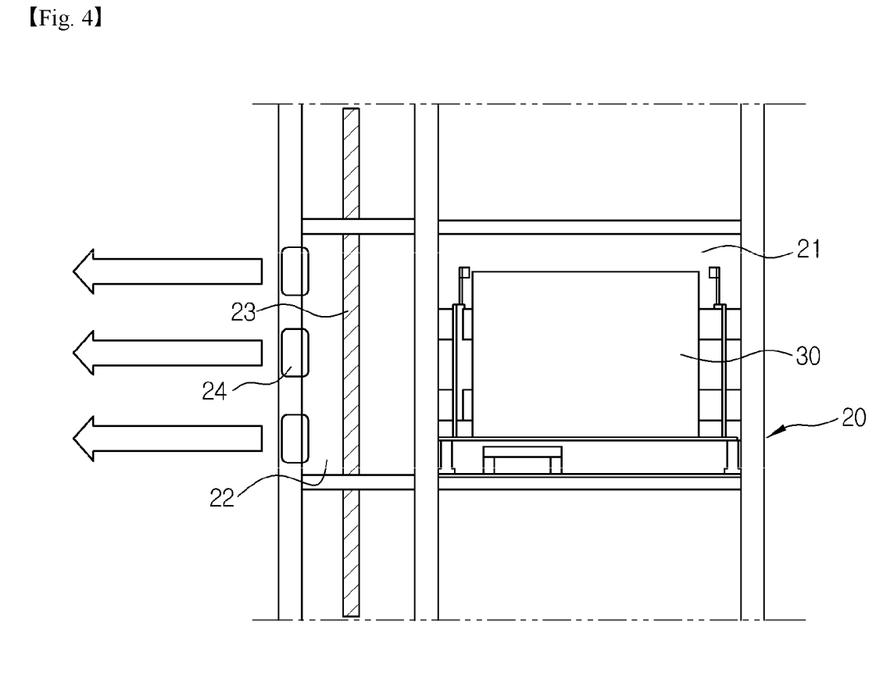
FIG. 4 is a side view thereof.

FIG. 3 is an enlarged perspective view of an accommodation space 21 portion of one charge/discharge box 30 in FIG. 2, and FIG. 4 is a side view thereof. Referring to these drawings, the wiring duct 22 is provided at one side of the accommodation space 21 provided in the accommodation structure 20, and a wire bundle made up of a plurality of wires 23 for supplying electricity to the charge/discharge box passes through the empty space of the wiring duct 22, and an exhaust fan 24 is installed at the external side of the wiring so as to discharge heat generated during charge/discharge from the charge/discharge box to the outside.

The performance of the lithium secondary battery may vary greatly depending on the temperature, and the activation process of the secondary battery is simultaneously performed by placing a plurality of charge/discharge boxes in layers in the process chamber and accommodating a plurality of battery cells in another charge/discharge box. As such, since there may be a temperature deviation between the charge/discharge boxes or between various battery cells in the charge/discharge box, it is important to maintain a uniform temperature distribution.

However, in the conventional charge/discharge device, as shown in FIGS. 3 and 4, the accommodation space 21 of the charge/discharge box 30 is open, so that external heat generation, temperature deviation, and the like are affected internally, and temperature variations occur between charge/discharge boxes according to such external influences. In addition, in the charge/discharge process of the secondary battery, in addition to the heat generated in the battery cell, a considerable amount of heat is generated in the wiring itself for supplying power to the plurality of charge/discharge boxes. Referring to the structure of a conventional charge/discharge device, the wiring is made inside the wiring duct 22 which contacts the accommodation space 21 of the charge/discharge box 30, and an exhaust fan 24 of the wiring duct 22 is installed outside the wiring to suck air in the wiring duct 22 to induce air flow to the outside of the charger/discharger. As such, the heat generated from the electric wire 23 was not discharged to the outside by the exhaust fan 24 smoothly, thereby lowering the heat discharge efficiency. As a result, the temperature inside the wiring duct 22 increases due to the heat generated by the wires arranged, and the temperature inside the wiring duct 22 affects the adjacent charge/discharge box 30. As such, there has been a problem that a temperature deviation occurs, and due to such a temperature deviation, a battery capacity or the like has been incorrectly measured or a measurement deviation has occurred, thereby lowering the reliability of the measurement.

DISCLOSURE

Technical Problem

Accordingly, the present invention is to solve the problems of the prior art as described above, and an object of the present invention is to provide a charge/discharge device for the activation process of a secondary battery that can uniformly control the internal temperature by preventing heat generated by wiring, etc. from affecting the inside of the charge/discharge box when the activation process is performed after manufacturing the secondary battery.

Technical Solution

A charge/discharge device for an activation process of a secondary battery according to the present invention includes an accommodation structure having a plurality of accommodation spaces, a wiring duct at one side of a corresponding accommodation space of the plurality of accommodation spaces, a charge/discharge box in each accommodation space of the plurality of accommodation spaces, wires wired in a space inside each wiring duct, and an exhaust fan on a first inner wall of each wiring duct Herein, the first inner wall may be adjacent to the one side of the corresponding accommodation space, and the wires are wired to pass an external side of the exhaust fan in each wiring duct.

Further, a heat insulation panel may be additionally installed together with the exhaust fan on the first inner wall in the wiring duct. Through this configuration, the internal temperature may be uniformly controlled by allowing the heat generated by the wiring, etc. at the time of performing the activation process of the secondary battery not to influence the inside of the charge/discharge box.

On the other hand, each exhaust fan blows air/wind from the first inner wall of each wiring duct in a direction of a second inner wall of each wiring duct facing it, blows directly to the electric wire that generates heat, and forcibly circulates the air inside the wiring duct to thereby be discharged. Hence, cooling efficiency is very excellent.

In addition, in order to further increase the cooling efficiency, an exhaust port may be further provided on the second inner wall of each wiring duct.

The exhaust fan may be provided in plurality, and the cooling efficiency may be further increased by a method of arranging the exhaust fans to be spaced apart from each other along the length direction/longitudinal direction or the width direction of the first inner wall of each wiring duct.

The secondary battery charging and discharging device may further include a heat insulation panel on the first inner wall of each wiring duct or a second inner wall of each wiring duct, and the insulation panel prevents heat generated from the wiring from moving to the charge/discharge box, thereby improving temperature variation, which is an effect of the present invention. In order to block heat flowing into the charge/discharge box from the wiring, the heat insulation panel is preferably installed on the first inner wall of each wiring duct. In addition, when the exhaust fan and the heat insulation panel are installed together, the exhaust fan may be installed on the upper portion of the heat insulation panel, and may form a through-hole penetrating through the heat insulation panel and the inner wall of the wiring duct together, and then may be inserted into and installed in the through-hole.

When the exhaust fan is installed on the heat insulation panel, there is an advantage that the cooling efficiency inside the wiring duct can be increased intensively. When the through-hole is formed in the inner wall of the heat insulation panel and the wiring duct, and the exhaust fan is inserted into the formed through-hole, the heat generated from the charge/discharge box as well as the heat generated from the wiring are absorbed and discharged together.

The charge/discharge device according to the present invention is electrically connected and operated by charge/discharge boxes and exhaust fans that are electrically connected by the wires, and each charge/discharge box is accommodated in an accommodation structure having an accommodation space of the charge/discharge box.

The accommodation structure is preferably a structure in which the accommodation spaces are arranged in a horizontal direction and a vertical direction such that the charge/discharge boxes are stacked in both the horizontal direction and the vertical direction to allow mass production of secondary batteries.

Further, when the secondary battery is activated by the charge/discharge device according to the present invention, the temperature deviation between the charge/discharge boxes can be significantly reduced, thereby improving the process deviation of the capacity and resistance which are very sensitive to temperature.

Advantageous Effects

According to the present invention, as the heat generated from the wires wired in the wiring duct to perform the activation process of the secondary battery is smoothly discharged to the outside by the exhaust fan, the effect on the internal charge/discharge box is significantly reduced, and the process deviation problem is improved, and when a heat insulation panel is additionally installed, the external temperature difference may be blocked by the heat insulation panel, thereby further reducing the temperature variation. Accordingly, since the temperature rise and the temperature deviation in the charge/discharge box are prevented or minimized, there is an effect that can solve the problem that the battery capacity is incorrectly measured or measurement deviation occurs.

DETAILED DESCRIPTION OF THE PREFERRED EMBODIMENTS

Hereinafter, the present invention will be described more specifically with reference to the accompanying drawings about exemplary embodiments of the present invention. It is to be understood that the following detailed description and drawings are merely illustrative of the embodiments of the present invention, and therefore the present invention should not be construed as being limited to the description and contents.

Meanwhile, in the present invention, terms indicating direction, such as 'upper' and 'lower' are used, but these terms are used on the basis of the drawings shown for ease of explanation and easy understanding. It is to be understood that they are used in the sense of relative relationship and not in the sense of absolute relationship, and these terms should not be unduly construed to limit the scope of the present invention.

Figure 5:
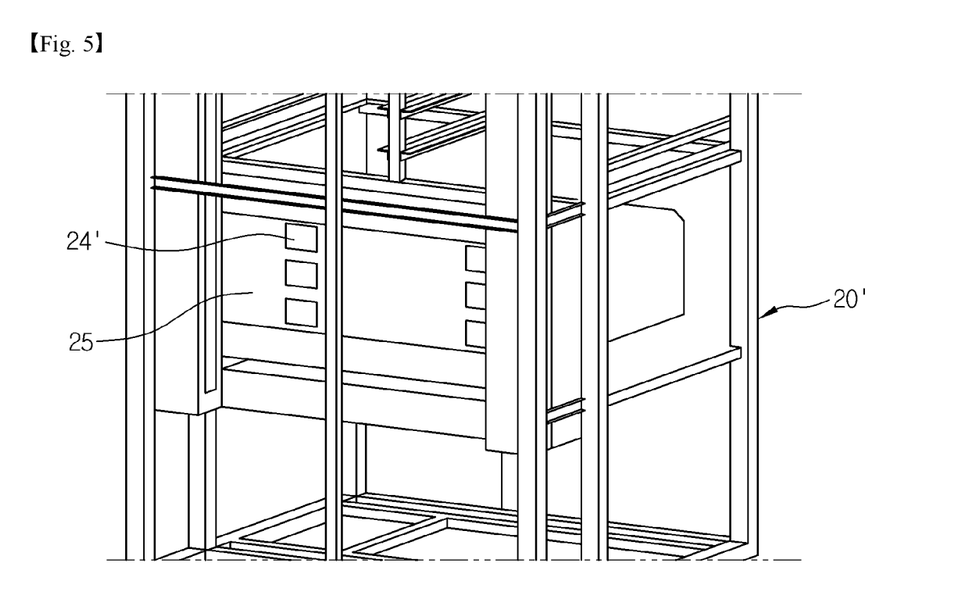
FIG. 5 is a perspective view illustrating one charge/discharge box part as one embodiment of a charge/discharge device according to the present invention.
Figure 6:
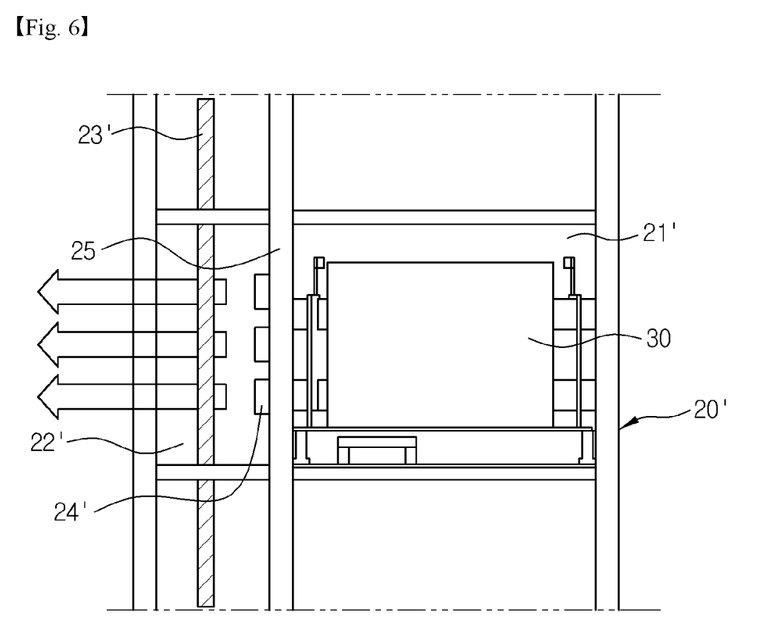
FIG. 6 is a side view thereof.

FIG. 5 is a perspective view illustrating one charge/discharge box part as one embodiment of a charge/discharge device according to the present invention, and FIG. 6 is a side view thereof. Referring to these drawings, the charge/discharge device of the present invention includes an accommodation structure 20' for accommodating and arranging a plurality of charge/discharge boxes. The accommodation structure 20' is provided with a plurality of accommodation spaces 21' to accommodate and install the charge/discharge boxes 30 therein. A wiring duct 22' is provided at one side of each of the accommodation spaces 21', and many wires 23' are wired to supply electricity to the charge/discharge boxes 30. Further, an exhaust fan 24' is provided to discharge heat generated during charging and discharging to the outside.

The accommodation structure 20' has a structure including a plurality of accommodation spaces 21' so as to accommodate a plurality of charge/discharge boxes 30 stacked in both horizontal and vertical directions, to thereby respond suitably to the mass production of secondary batteries.

In addition, an exhaust fan 24' is mounted on the inner wall 25, and a plurality of exhaust fans may be disposed in a state spaced apart from each other along a length direction or a width direction of the inner wall 25 of the wiring duct (FIG. 5 shows some of the plurality of exhaust fans that can be installed).

Meanwhile, in the charge/discharge device of the present invention, a heat insulation panel 26 may be additionally installed on the inner wall 25 of the wiring duct 22'. By the heat insulation panel, when the secondary battery is activated, heat generated by wiring or the like and an external temperature difference can be prevented from affecting the inside of the charge/discharge box, thereby controlling the temperature inside the charge/discharge box to be uniform.

When the insulation panel is additionally installed on the inner wall 25, according to an embodiment of the present invention (see FIG. 7), an exhaust fan may be installed on the heat insulation panel, and according to another embodiment of the present invention (see FIG. 8), after forming a through-hole penetrating the heat insulation panel and the inner wall 25 together, the exhaust fan may be inserted into the formed through-hole to be installed.

Figure 7:
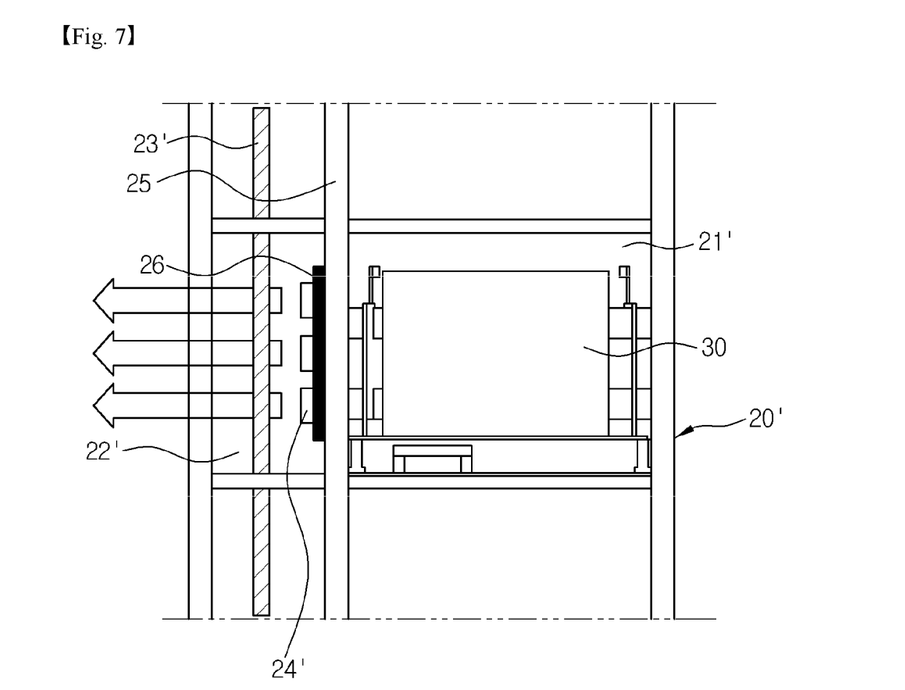
FIG. 7 is a side view of an embodiment of a charge/discharge device according to the present invention, in which a heat insulation panel is installed on an inner wall of a wiring duct of the charge/discharge device, and an exhaust fan is installed thereon.
Figure 8:
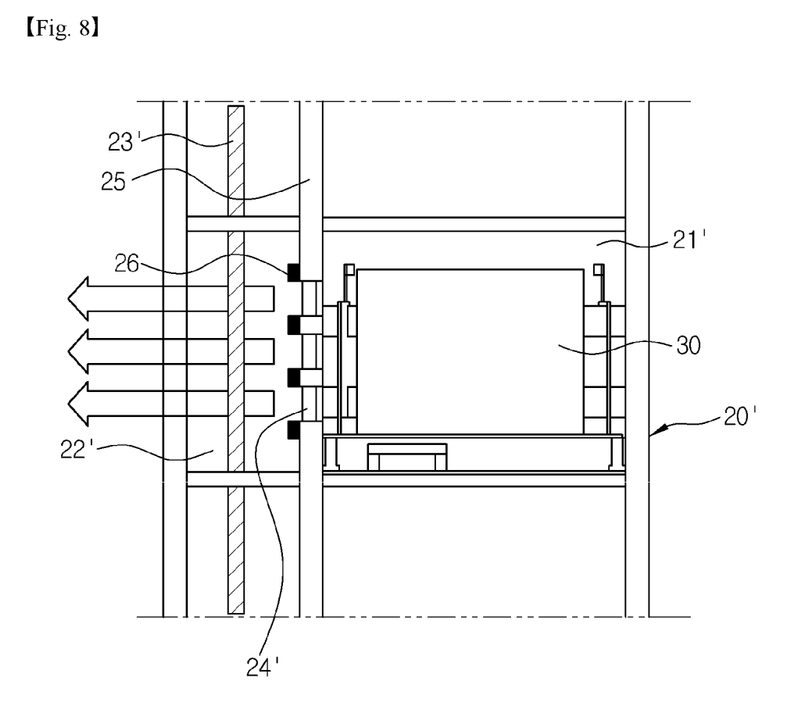
FIG. 8 is a side view of an embodiment of a charge/discharge device according to the present invention, in which an insulation panel is installed on an inner wall of a wiring duct of the charge/discharge device, and an exhaust fan is inserted through an inner wall of the wiring duct and a heat insulation panel.

When the exhaust fan is installed on the heat insulation panel, the cooling efficiency of the inside of the wiring duct 22' can be increased intensively. Further, in the case where the through-hole is formed and the exhaust fan is inserted into the inner wall 25, it is preferable in that heat generated from the charge/discharge box 30 can be absorbed and discharged.

On the other hand, the electric wire 23' for supplying electricity to the charge/discharge box 30 is arranged in the wiring duct 22', but is wired outside the exhaust fan 24'. The structure of such a device makes it possible to efficiently discharge heat by directly blowing wind generated by the exhaust fan from the electric wires 23' generating heat.

The heat insulation panel can be used without particular limitation as long as it can be installed on the inner wall 25 of the wiring duct and can allow the exhaust fan 24' to be installed and supported. Further, since any appropriate material among those known to one of ordinary skill in the art can be used as a material of such a heat insulation panel, a detailed description thereof will be omitted here.

Figure 9:
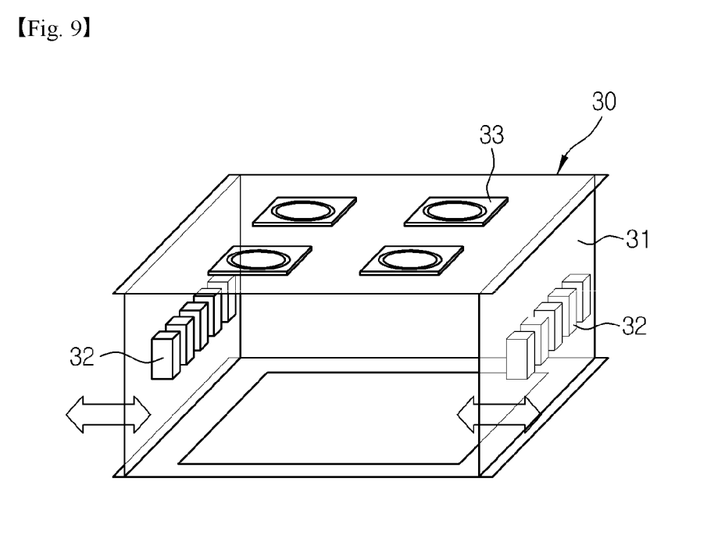
FIG. 9 is a perspective view showing an example of a charge/discharge box of a charge/discharge device according to the present invention.

Any change/discharge box known to one of ordinary skill in the art may be used as the charge/discharge box 30 in the present invention. FIG. 9 is a perspective view schematically showing an example of a charge/discharge box that can be used in a charge/discharge device according to the present invention. Referring to FIG. 9, the charge/discharge box 30 has a form in which charge/discharge terminals 32 are provided on the left and right sidewalls of a box-shaped body 31, and these charge/discharge terminals 32 are configured to be able to contact the electrode leads of a plurality of battery cells mounted in a battery tray (not shown) to apply electric current. Meanwhile, a blowing fan 33 may be installed at the ceiling of the body to cool the heat generated during the activation process. The box-shaped body has a structure in which at least one side of the four sides is open, and the tray is put into the inside or discharged by a stacker crane (not shown) through the opening.

In the charge/discharge box of the present invention, a battery tray is used to easily and safely handle a plurality of battery cells, and a plurality of battery cells are stored therein and are put into the charge/discharge box to perform a charge/discharge process. As the battery tray can be properly selected and used by those skilled in the art from those known in the art, a detailed description thereof is also omitted here.

As described above in detail, the charge/discharge device according to the present invention does not affect the inside of the charge/discharge box by heat generation due to wiring or the like, external temperature difference, etc. when the secondary battery is activated. Further, the charge/discharge device can allow the heat generated from the wires connected to the wiring duct to be smoothly discharged to the outside, thereby preventing or minimizing the temperature rise and temperature variation in the charge/discharge box, which is very useful industrially.

While the present invention has been particularly shown and described with reference to exemplary embodiments thereof, it is to be understood that the invention is not to be limited to the details thereof, and it will be apparent to those skilled in the art that various modifications such as the above description, substitutions of components and the like, addition of additional components, and the like may be made without departing from the scope of the present invention based on the above description.

DESCRIPTION OF SYMBOLS

10: activation process chamber
20, 20': accommodation structure
21, 21': accommodation space
22, 22': wiring duct
23, 23': wire
24, 24': exhaust fan
25: inner wall of wiring duct
26: heat insulation panel
30: charge/discharge box
31: body
32: charge/discharge terminal
33: blowing fan

The invention claimed is:
1. A charge/discharge device for an activation process of a secondary battery, the charge/discharge device comprising:
   an accommodation structure having a plurality of accommodation spaces;
   a wiring duct at one side of each accommodation space of the plurality of accommodation spaces;
   a charge/discharge box in each accommodation space of the plurality of accommodation spaces;
   wires wired in a space inside each wiring duct; and
   an exhaust fan on a first inner wall of each wiring duct, the first inner wall being adjacent to the one side of each accommodation space,
   wherein the wires are wired to pass an external side of the exhaust fan in each wiring duct such that the exhaust fan is located between the charge/discharge box and the wires wired in the space inside each wiring duct.

2. The charge/discharge device of claim 1, wherein each exhaust fan blows air from the first inner wall of each wiring duct in a direction of a second inner wall of each wiring duct facing the exhaust fan.

3. The charge/discharge device of claim 1, wherein an exhaust port is provided on a second inner wall of each wiring duct facing the first inner wall of each wiring duct.

4. The charge/discharge of claim 1, wherein each exhaust fan is provided in plurality to thereby be arranged to be spaced apart from each other along a longitudinal direction or a width direction of the first inner wall of each wiring duct.

5. The charge/discharge device of claim 1, further comprising a heat insulation panel on the first inner wall or a second inner wall of each wiring duct.

6. The charge/discharge device of claim 5, wherein the heat insulation panel is on the first inner wall of each wiring duct, and wherein the exhaust fan in each wiring duct is installed on the heat insulation panel in each wiring duct.

7. The charge/discharge device of claim 5, wherein at least one through-hole, which penetrates the heat insulation panel and the first inner wall of each wiring duct, is formed, and wherein the exhaust fan in each wiring duct is inserted into the through-hole.

8. The charge/discharge box of claim 1, wherein the charge/discharge boxes and the exhaust fans are electrically connected by the wires.

9. The charge/discharge device of claim 1, wherein the accommodation spaces are arranged in both a horizontal direction and a vertical direction such that the charge/discharge boxes are stacked in both the horizontal direction and the vertical direction.

10. A secondary battery activation method comprising using the charge/discharge device according to claim 1 to charge/discharge a secondary battery to activate the secondary battery.

* * * * *